United States Patent
Dimou et al.

(10) Patent No.: US 9,622,123 B2
(45) Date of Patent: Apr. 11, 2017

(54) METHODS FOR HANDOVER CONFIGURATION

(71) Applicant: Telefonaktiebolaget L M Ericsson (publ), Stockholm (SE)

(72) Inventors: Konstantinos Dimou, Stockholm (SE); Yu Yang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 126 days.

(21) Appl. No.: 14/064,922

(22) Filed: Oct. 28, 2013

(65) Prior Publication Data
US 2014/0045500 A1  Feb. 13, 2014

Related U.S. Application Data

(63) Continuation-in-part of application No. 13/914,081, filed on Jun. 10, 2013.

(60) Provisional application No. 61/658,180, filed on Jun. 11, 2012.

(51) Int. Cl.
*H04W 36/00* (2009.01)
*H04W 36/14* (2009.01)
*H04W 36/30* (2009.01)

(52) U.S. Cl.
CPC ....... *H04W 36/0083* (2013.01); *H04W 36/14* (2013.01); *H04W 36/30* (2013.01)

(58) Field of Classification Search
CPC ................................................ H04W 36/0083
See application file for complete search history.

(56) References Cited

U.S. PATENT DOCUMENTS

| 6,549,779 B1 | 4/2003 | Muller et al. |
| 7,499,700 B2 | 3/2009 | Dillon et al. |
| 7,881,251 B2 | 2/2011 | Hovey |
| 2003/0069018 A1* | 4/2003 | Matta et al. ................. 455/436 |

(Continued)

FOREIGN PATENT DOCUMENTS

| EP | 1887739 A1 | 2/2008 |
| EP | 1998583 A1 | 12/2008 |

(Continued)

OTHER PUBLICATIONS

Kürner, T., et al., "Final Report on Self-Organisation and its Implications in Wireless Access Networks", INFSO-ICT-216284 SOCRATES D5.9, Dec. 31, 2010, pp. 1-135, retrieved on Nov. 20, 2013, retrieved from internet: www.fp7-socrates.org.

(Continued)

*Primary Examiner* — Mazda Sabouri
(74) *Attorney, Agent, or Firm* — Coats & Bennett, PLLC

(57) ABSTRACT

The dynamic determination of a handover trigger for triggering handover of a mobile terminal in a wireless network from a source base station to a target base station is based on one or more Key Performance Indicators (KPIs). Each KPI indicates a quality of wireless services provided by the wireless network responsive to a particular handover trigger. If an obtained parameter that indirectly or directly impacts handover performance passes a corresponding performance test, the mobile terminal selects the handover trigger based on the KPIs. If the parameter fails the corresponding performance test, the source base station selects the handover trigger based on the KPIs.

18 Claims, 6 Drawing Sheets

(56) References Cited

U.S. PATENT DOCUMENTS

| | | | |
|---|---|---|---|
| 2008/0192925 A1 | 8/2008 | Sachs et al. | |
| 2008/0205345 A1 | 8/2008 | Sachs et al. | |
| 2009/0131053 A1 | 5/2009 | Sachs et al. | |
| 2010/0080193 A1 | 4/2010 | Sakai | |
| 2010/0273487 A1 | 10/2010 | Alonso-Rubio et al. | |
| 2012/0088509 A1* | 4/2012 | Yi | 455/437 |
| 2012/0214501 A1 | 8/2012 | Johannson et al. | |
| 2012/0282931 A1 | 11/2012 | Giustina et al. | |
| 2013/0053092 A1* | 2/2013 | Laitinen et al. | 455/525 |
| 2013/0065632 A1* | 3/2013 | Macias et al. | 455/525 |
| 2013/0143578 A1* | 6/2013 | Lekutai | 455/444 |
| 2013/0189996 A1* | 7/2013 | Sridhar | H04W 36/0083 455/444 |
| 2013/0223403 A1* | 8/2013 | Chen et al. | 370/331 |
| 2014/0200004 A1 | 7/2014 | Wegmann et al. | |

FOREIGN PATENT DOCUMENTS

| | | |
|---|---|---|
| EP | 2605585 A1 | 6/2013 |
| WO | 9943178 A1 | 8/1999 |
| WO | 03017539 A1 | 2/2003 |
| WO | 2008115116 A1 | 9/2008 |
| WO | 2010110705 A1 | 9/2010 |
| WO | 2012150880 A1 | 11/2012 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification, 3GPP TS 36.300 V8.7.0, Dec. 1, 2008, pp. 1-144, 3GPP, France.

3rd Generation Partnership Project, "3rd Generation Partnership Project; Technical Specification Group Radio Access Network; Evolved Universal Terrestrial Radio Access (E-UTRA) Radio Resource Control (RRC); Protocol specification (Release 8)", Technical Specification, 3GPP TS 36.331 V8.4.0, Dec. 1, 2008, pp. 1-198, 3GPP, France.

Dimou, K., et al., "Handover within 3GPP LTE: Design Principles and Performance", 2009 IEEE 70th Vehicular Technology Conference Fall, Sep. 20, 2009, pp. 1-5, IEEE.

Yang, Y. et al. "Apparatus and Method for Selecting HO Triggers", U.S. Appl. No. 13/914,081, filed Jun. 10, 2013.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.5.0, Mar. 1, 2012, pp. 1-302, 3GPP, France.

Kürner, T. et al., "Final Report on Self-Organisation and its Implications in Wireless Access Networks", Seventh Framework Programme, INFSO-ICT-216284 SOCRATES D5.9, Jan. 17, 2010, pp. 1-135, SOCRATES, retrieved from internet: http://www.fp7-socrates.org/filed/Deliverables/SOCRATES_D5.9 Final Report on self-organisation and its implications in wireless access network. pdf.

* cited by examiner the wireless network passes a performance test. The resource control message includes a first information element comprising a first KPI for each of a first candidate trigger and a second candidate trigger. Each first KPI indicates, for the corresponding candidate trigger, a quality of wireless services provided by the wireless network to the mobile terminal. The trigger selection circuit is configured to select one of the first and second candidate triggers as the handover trigger based on a first comparison between the first KPIs for the first and second candidate triggers received in the resource control message.

Figure 1:
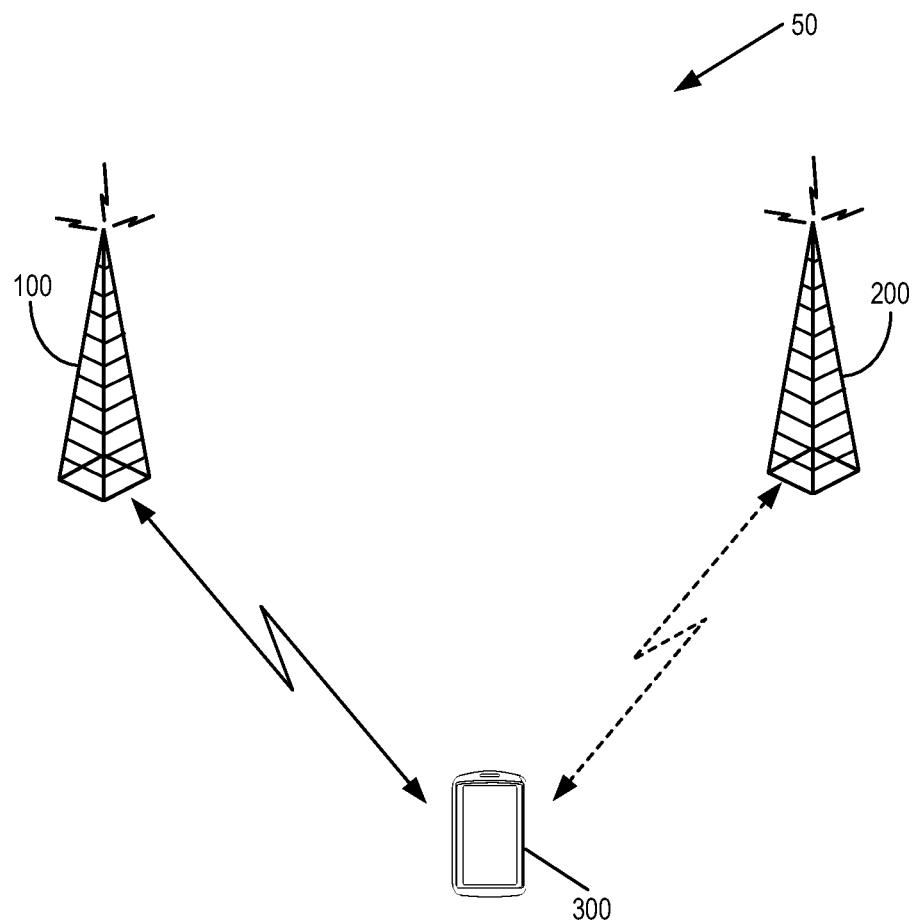
FIG. 1 shows a wireless communication network.

The solution disclosed herein relates generally to wireless communications, and more particularly to the determination and communication of handover triggers.

BACKGROUND

During handover of a mobile terminal in a wireless communication network, control of an ongoing wireless communication session involving the mobile terminal is transferred from one network node, e.g., a source base station, to another network node, e.g., a target base station. Handover is performed as the mobile terminal moves out of the area covered by the source base station and into the area covered by the target base station.

Wireless networks typically use handover triggers to initiate or trigger handover of the mobile terminal from the source base station to the target base station. Both simulation results and field trials show that the optimal handover trigger substantially reduces the handover failure rate and improves system and service performance. Thus, overall performance of the wireless communication network relies on the careful choice of the handover trigger(s). This is particularly true for handover triggers associated with macro or pico cells, and for networks associated with different access technologies and/or standards (e.g., heterogeneous networks, which may include macro and pico cells), where the wrong handover trigger causes more pronounced problems than in homogeneous networks.

SUMMARY

The solution disclosed herein dynamically determines a handover trigger for triggering handover of a mobile terminal in a wireless network from a source base station to a target base station based on one or more Key Performance Indicators (KPIs). Each KPI indicates a quality of wireless services provided by the wireless network responsive to a particular handover trigger. If an obtained parameter that indirectly or directly impacts handover performance passes a corresponding performance test, the mobile terminal selects the handover trigger based on the KPIs. If the parameter fails the corresponding performance test, the source base station selects the handover trigger based on the KPIs. Exemplary KPIs include, but are not limited to, a number of handover failures, a number of ping-pong handovers, a measurement of a time period where the mobile terminal is not in a preferred cell, a number of handover initiations, a service performance parameter, a Reference Signal Received Power (RSRP), a Signal-plus-Interference to Noise Ratio (SINR), a Signal-to-Noise Ratio (SNR), a handover delay, and a Voice over Internet Protocol (VoIP) performance parameter that results from or is otherwise associated with a particular handover trigger.

According to one exemplary method executed at a source base station, a first Key Performance Indicator (KPI) is obtained for each of a first candidate trigger and a second candidate trigger. Each first KPI indicates, for the corresponding candidate trigger, a quality of wireless services provided by the wireless network to the mobile terminal. The method further includes obtaining a parameter associated with at least one of the mobile terminal and the wireless network, wherein the parameter indirectly or directly impacts handover performance. If the parameter passes a corresponding performance test, the method includes sending the first KPIs to the mobile terminal to facilitate a selection at the mobile terminal of one of the first and second candidate triggers as the handover trigger based on the first KPIs. If the parameter fails the corresponding performance test, the method includes selecting one of the first and second candidate triggers as the handover trigger based on a first comparison between the first KPIs for the first and second candidate triggers.

An exemplary source base station comprises a KPI circuit, a parameter circuit, and a trigger circuit. The KPI circuit is configured to obtain a first KPI for each of a first candidate trigger and a second candidate trigger, wherein each first KPI indicates, for the corresponding candidate trigger, a quality of wireless services provided by the wireless network to the mobile terminal. The parameter circuit is configured to obtain a parameter associated with at least one of the mobile terminal and the wireless network, where the parameter indirectly or directly impacts handover performance. The trigger circuit is configured to send the first KPIs to the mobile terminal to facilitate a selection at the mobile terminal of one of the first and second candidate triggers as the handover trigger based on the first KPIs if the parameter passes a corresponding performance test. If the parameter fails the corresponding performance test, the trigger circuit is configured to select one of the first and second candidate triggers as the handover trigger based on a first comparison between the first KPIs for the first and second candidate triggers.

According to an exemplary method executed at a mobile terminal, a resource control message is received from the source base station. The resource control message includes a first information element comprising a first KPI for each of a first candidate trigger and a second candidate trigger. Each first KPI indicates, for the corresponding candidate trigger, a quality of wireless services provided by the wireless network to the mobile terminal. The method further includes selecting one of the first and second candidate triggers as the handover trigger based on a first comparison between the first KPIs for the first and second candidate triggers received in the resource control message.

Figure 3:
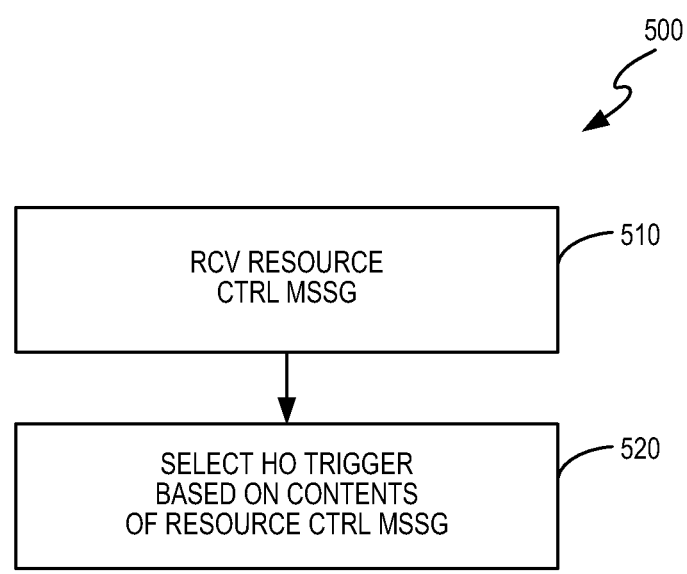

An exemplary mobile terminal comprises a receiver and a trigger selection circuit. The receiver is configured to receive a resource control message from the source base station when a handover performance affecting parameter associated with at least one of the mobile terminal and FIG. 3 shows a method for a mobile terminal according to one exemplary embodiment.

Figure 4:
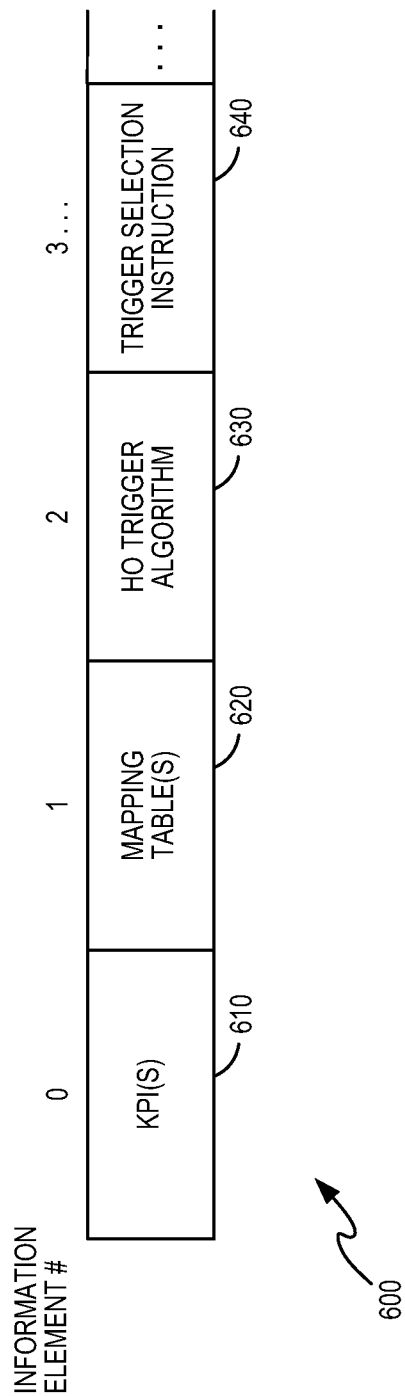

FIG. 4 shows an exemplary resource control message.

Figure 5:
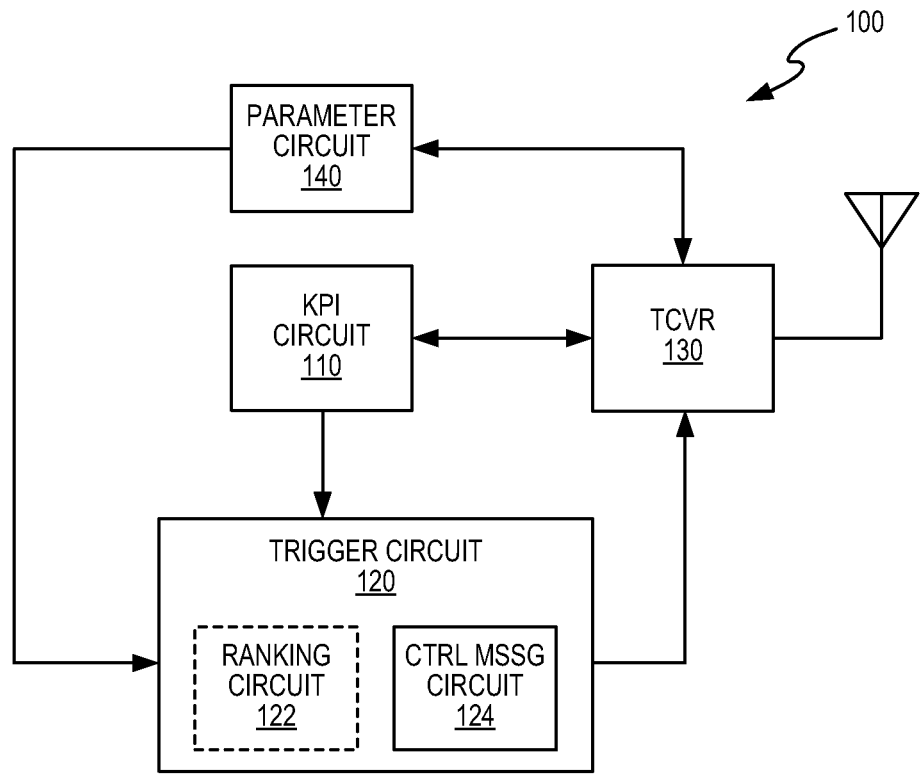

FIG. 5 shows a block diagram of source base station according to one exemplary embodiment.

Figure 6:
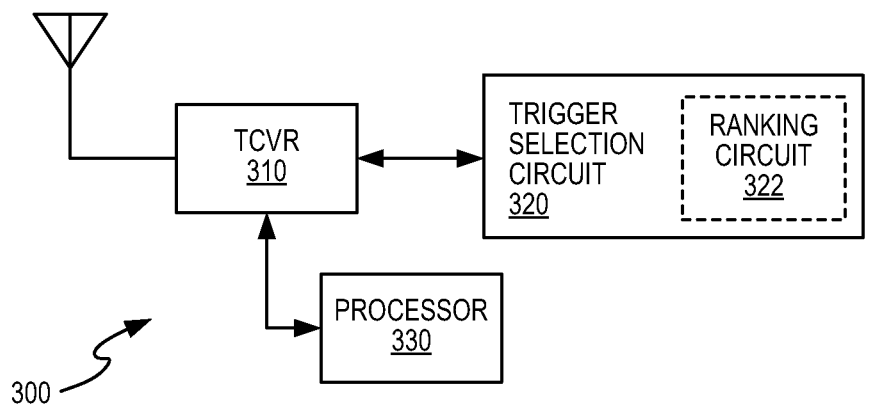

FIG. 6 shows a block diagram of mobile terminal according to one exemplary embodiment.

Figure 7:
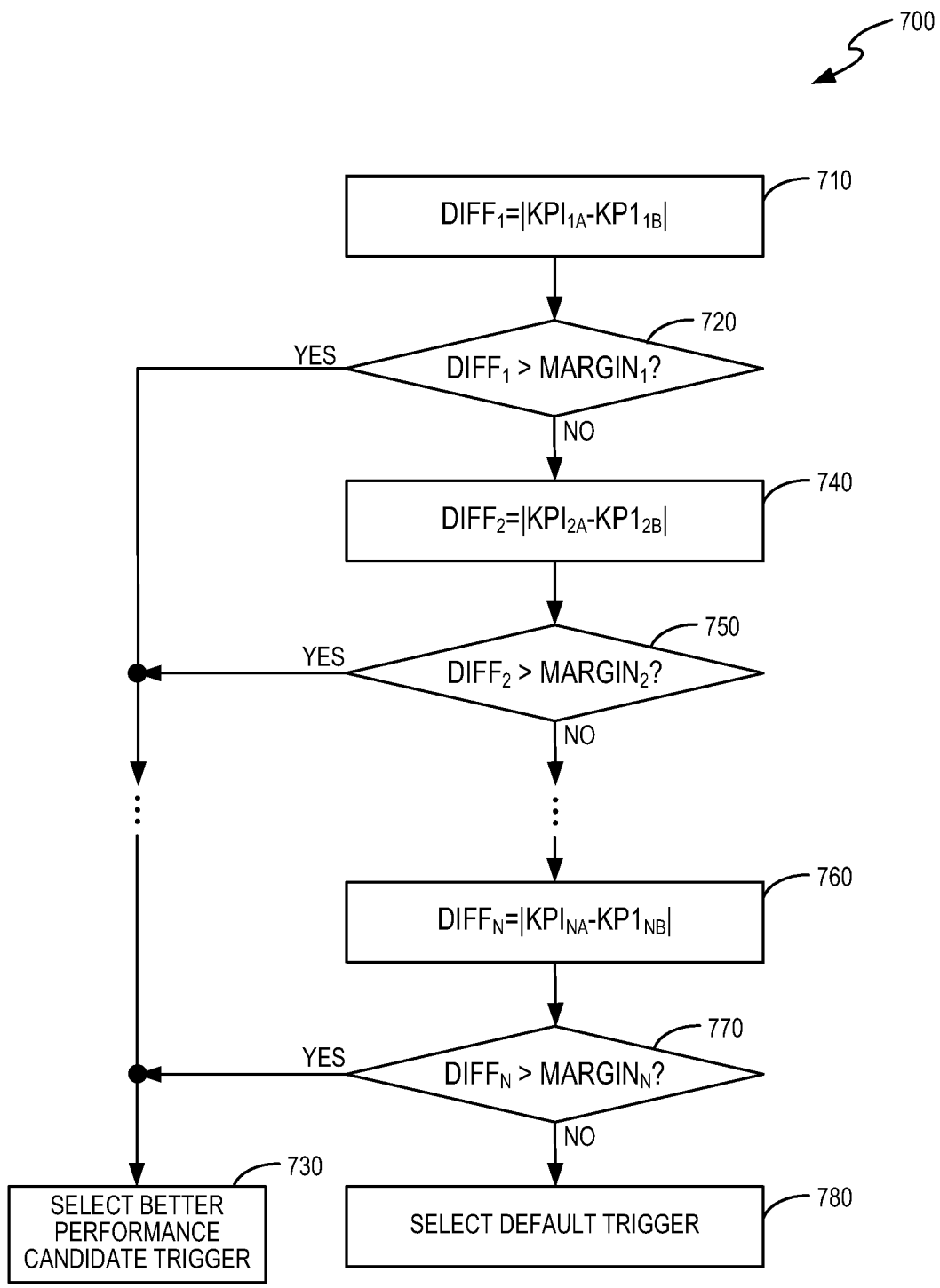

FIG. 7 shows a method according to one exemplary embodiment.

DETAILED DESCRIPTION

FIG. 1 shows the main elements of an exemplary wireless network 50 involved in a handover of a mobile terminal 300 from a source base station 100 to a target base station 200. As used herein, wireless network 50 may comprise any network that provides wireless services according to any known wireless protocol, e.g., Long Term Evolution (LTE). As used herein, the base stations 100, 200 may comprise any access point for the mobile terminal 300 within the wireless network 50, e.g., a NodeB, an eNodeB, etc. As used herein, the mobile terminal 300 may comprise any portable/movable device that includes a wireless transceiver for communicating within the wireless network 50, e.g., a cellular telephone, tablet computer, laptop computer, automobile computer, etc. As long as the mobile terminal 300 is within the cell or area covered by the source base station 100, the source base station 100 controls some or all communications to and from the mobile terminal 300. As the mobile terminal 300 moves within the network 50, e.g., towards the target base station 200, the mobile terminal 300 moves out of the coverage area of the source base station 100. As a result, the overall quality of the wireless communications between the source base station 100 and the mobile terminal 300 deteriorates. In such scenarios, handover of the mobile terminal 300 to the target base station 200 prevents the mobile terminal 300 from experiencing a loss of wireless service.

A handover trigger represents one or multiple conditions that, if satisfied, will trigger a handover of a mobile terminal 300 from a source base station 100 to a target base station 200. Thus, handover triggers facilitate the decision process regarding whether to handover a mobile terminal 300. Depending on the configuration of the wireless network 50, satisfaction of the handover trigger may be sufficient to trigger a handover, or the trigger may represent a subset of the conditions considered when a handover is triggered. For example, a handover trigger may include one or both of a hysteresis value and a time to trigger (TTT) value. In such embodiments, a handover is triggered when a signal strength measurement (e.g., RSRP) for a target base station 200 exceeds a signal strength measurement for a source base station 100 by more than an amount indicated by the hysteresis value for longer than a period of time indicated by the TTT value.

If a handover trigger causes handover to occur more often than necessary, system performance may suffer. If a handover trigger causes handover to occur less often than necessary, service performance associated with individual mobile terminals 300 may suffer. Thus, it is important to choose a handover trigger that carefully balances system performance, service performance, and other wireless parameters, e.g., a desired handover failure rate. Conventional systems attempt to achieve this balance by using a fixed handover trigger predetermined based on expected network conditions, expected network parameters, desired performance goals, etc. Because the performance of a handover trigger fluctuates based on various parameters, however, such fixed handover triggers cannot effectively or optimally deal with all handover situations. For example, optimal handover triggers tend to vary with the source/target cell size, source/target cell load, mobile terminal speed, etc.

Embodiments of the solution disclosed herein determine whether the source base station 100 or mobile terminal 300, depending on the status of one or more variable network parameters, dynamically selects a handover trigger based on one or more Key Performance Indicators (KPIs). Each network parameter directly or indirectly impacts handover performance. Exemplary parameters include, but are not limited to, mobile terminal speed, cell load, and network type. Each KPI indicates a quality of wireless services provided by the wireless network 50 responsive to a particular handover trigger. Exemplary KPIs include, but are not limited to:
  a number of handover failures;
  a number of ping-pong handovers;
  a measurement of a time period where the mobile terminal 300 is not in a preferred cell;
  a number of handover initiations;
  service performance parameters (e.g., packet delay, packet error rate);
  a Reference Signal Received Power (RSRP);
  a Signal-plus-Interference to Noise Ratio (SINR);
  a Signal-to-Noise Ratio (SNR);
  a handover delay (e.g., the time difference between the time instant the handover decision is made at the serving base station to the time instant the mobile terminal acknowledges receipt of a handover command message); and
  a Voice over Internet Protocol (VoIP) performance parameter that results from or is otherwise associated with a particular handover trigger.

These KPIs may be determined by or may be available at the mobile terminal 300, the source base station 100, and/or another network node. By dynamically selecting the handover trigger based on the KPIs at the source base station 100 or mobile terminal 300 depending on the variable network parameter(s), the handover trigger used to make handover decisions more accurately accounts for the variability of the network parameters. As a result, the solution presented herein reduces the handover failure rate, and improves system and service performances.

Figure 2:
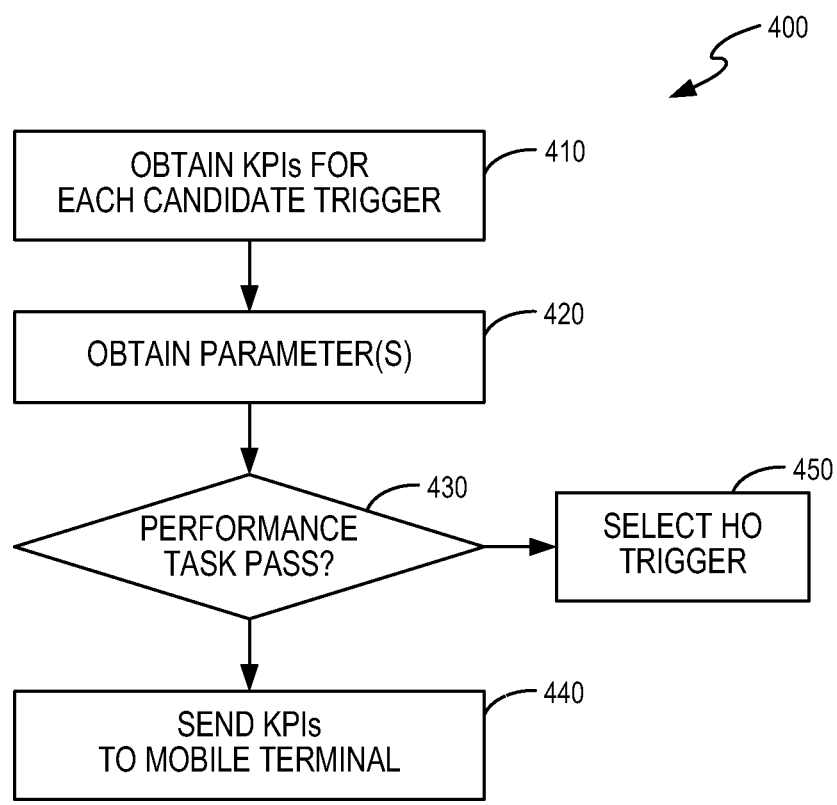
FIG. 2 shows a method for a source base station according to one exemplary embodiment.
METHODS FOR HANDOVER CONFIGURATION This application is a continuation-in-part of U.S. patent application Ser. No. 13/914,081 filed 10 Jun. 2013, which claims priority to Provisional U.S. Patent Application No. 61/658180 filed 11 Jun. 2012, the disclosures of which are incorporated herein by reference in their entirety.

FIG. 2 shows an exemplary method 400, as executed by the source base station 100, for dynamically determining a handover trigger for triggering handover of the mobile terminal 300 from the source base station 100 to the target base station 200. Method 400 includes obtaining at least one KPI for each of a first candidate trigger and a second candidate trigger (block 410), and obtaining a parameter associated with the mobile terminal 300 and/or the wireless network 50. The obtained KPIs may be determined by or may be made available to the mobile terminal 300, the source base station 100, and/or another network node. The obtained parameter comprises a parameter that directly or indirectly impacts handover performance. If the parameter passes a corresponding performance test (block 430), e.g., if the speed of the mobile terminal 300 equals or exceeds a speed threshold, the source base station 100 sends the KPI(s) to the mobile terminal 300 (block 440), e.g., as part of a resource control message. The mobile terminal 300 then selects the first or second candidate trigger based on the received KPIs. If, however, the parameter fails the corresponding performance test (block 430), e.g., if the speed of the mobile terminal 300 is less than the speed threshold, the source base station 100 selects the first or second candidate trigger based on the obtained KPIs (block 450). For example, source base station 100 may compare the KPI(s) obtained for the first and second candidate triggers, and select the first or second candidate trigger based on the comparison(s). In this scenario, source base station 100 may also inform the mobile terminal 300 of the selected handover trigger.

Exemplary parameters used for the performance test include, but are not limited to, the speed of the mobile terminal, cell load, network type, etc. Such parameters may be determined/obtained periodically according to some predetermined rate. Alternatively, the parameter may be determined/obtained only under certain conditions, e.g., when data is being exchanged between the source base station 100 and the mobile terminal 300. For example, when the source base station 100 and mobile terminal 300 are exchanging data, Doppler frequency shifts estimation may be used to determine the speed of the mobile terminal 300. In either case, it will be appreciated that the network 50, e.g., the source base station 100, or the mobile terminal 300, may determine the parameter. It will further be appreciated that one or more of the obtained parameters may be used to determine whether the source base station 100 or the mobile terminal 300 determines the handover trigger.

FIG. 3 shows one exemplary method 500 executed at the mobile terminal 300 for selecting the handover trigger. Mobile terminal 300 receives a resource control message, e.g., a Radio Resource Control (RRC) message, from the source base station 100 (block 510). The resource control message includes any network-determined KPIs necessary to enable the mobile terminal 300 to determine the handover trigger. The mobile terminal 300 selects the first or second candidate trigger based on the contents of the resource control message (block 520). More particularly, the mobile terminal 300 compares the KPI(s) for the first and second candidate triggers, and selects the first or second candidate trigger based on the comparison(s). In one embodiment, the receipt of the resource control message at the mobile terminal 300 serves as an implicit instruction to the mobile terminal 300 to select the handover trigger. In another embodiment, the resource control message includes an explicit instruction to the mobile terminal 300, e.g., a handover selection flag, to select the handover trigger.

The mobile terminal 300 may store the KPI(s) received from the source base station 100. If the mobile terminal 300 has multiple ones of the same KPI, e.g., multiple SNRs, the mobile terminal 300 only stores the most recently received KPI(s), or the mobile terminal 300 stores a filtered value taking into account the stored KPI(s) and the most recently received KPI(s). While not required, the mobile terminal 300 may also delete some or all of the stored KPIs once the handover trigger has been determined, e.g., by the source base station 100 or the mobile terminal 300.

The resource control message used by the source base station 100 to provide the KPIs to the mobile terminal 300 comprises one or more information elements (IEs). While not required, the resource control message may comprise a Radio Resource Control (RRC) message as defined by Wideband Code Division Multiple Access (WCDMA) or Long Term Evolution (LTE). The source base station 100 may create a new resource control message or may use an existing resource control message to provide the KPIs to the mobile terminal 300. One information element (IE) in the resource control message comprises KPIs for each of the candidate triggers. FIG. 4 shows one exemplary resource control message 600 comprising one or more IEs 610-640. A first IE 610 (IE #0) includes the KPI(s) provided by the source base station 100 to the mobile terminal 300. Exemplary KPIs included in IE #0 610 are those KPIs obtained by the source base station 100 and not already known by the mobile terminal 300. It will be appreciated that some KPIs used by the mobile terminal 300 to determine the handover trigger are determined by the mobile terminal 300, and therefore, are already known by the mobile terminal 300. When necessary, the mobile terminal 300 may convey such KPI(s) to the source base station 100 using another resource control message. While not required, the resource control message 600 may also include one or more additional IEs. For example, the resource control message 600 may include a mapping table IE 620 (IE #1), a handover trigger algorithm IE 630 (IE #2), and/or a trigger selection instruction IE 640 (IE #3). The mapping table IE 620 includes one or more mapping tables that map different scenarios associated with different parameters to different handover triggers. The handover trigger algorithm IE 630 includes a sequence of steps to be executed by the mobile terminal 300 to determine the handover trigger based on the KPIs, e.g., the KPIs in the KPI IE 610. The trigger selection instruction IE 640 comprises an explicit instruction to the mobile terminal 300 to determine the handover trigger.

Table 1 shows one exemplary mapping table that may be included in IE #1 620 when the mobile terminal 300 is approaching a macro neighbor cell. This mapping table maps the speed of the mobile terminal 300 to a handover trigger depending on the cell load, where the handover trigger comprises a hysteresis value and a time to trigger (TTT) value. As previously noted, a handover is triggered when a signal strength measurement for a target base station 200 exceeds a signal strength measurement for a source base station 100 by more than an amount indicated by the hysteresis value for longer than the time indicated by the TTT value.

TABLE 1

Approaching Macro Neighbor (Target) Cell

| Mobile Terminal Speed | Cell Load (PRB Utilization <50%) | | Cell Load (PRB Utilization >50%) | |
| --- | --- | --- | --- | --- |
| | Hysterisis (dB) | TTT (ms) | Hysterisis (dB) | TTT (ms) |
| <20 km/hr | 0 | 1280 | 0 | 640 |
| 20 km/hr or 80 km/hr | 2 | 320 | 2 | 160 |
| >80 km/hr | 4 | 0 | 4 | 0 |

Table 2 shows one exemplary mapping table that may be included in IE #1 620 when the mobile terminal 300 is approaching a pico neighbor cell.

TABLE 1

Approaching Pico Neighbor (Target) Cell

| Mobile Terminal Speed | Cell Load (PRB Utilization <50%) | | Cell Load (PRB Utilization >50%) | |
| --- | --- | --- | --- | --- |
| | Hysterisis (dB) | Duration (ms) | Hysterisis (dB) | Duration (ms) |
| <20 km/hr | 0 | 640 | 0 | 320 |
| 20 km/hr or 80 km/hr | 1 | 160 | 1 | 80 |
| >80 km/hr | 3 | 0 | 3 | 0 |

As shown by Tables 1 and 2, the higher the serving cell load (as measured in terms of percentage of Physical Resource Block (PRB) utilization), the easier it is to trigger handover. As shown by Table 2, more aggressive thresholds are typically used when the mobile terminal 300 is approaching a pico neighbor cell. In any event, the source base station 100 or the mobile terminal 300 may adjust one or more values (or may default to one or more values) in such a mapping table based on current KPIs to implement handover triggers that better account for the variable network parameters, e.g., the speed of the mobile terminal.

As noted above, the source base station 100 or the mobile terminal 300 selects one of the candidate triggers as the handover trigger based on one or more comparisons between the corresponding KPIs for each candidate trigger. For example, assume one KPI is obtained for each of two candidate triggers, e.g., $KPI_A$ and $KPI_B$. In this example, the candidate trigger associated with a better one of $KPI_A$ and $KPI_B$ when a difference between the KPIs $|KPI_A-KPI_B|$ exceeds a predetermined margin may be selected as the handover trigger. If the source base station 100 selects the handover trigger, the source base station 100 may transmit an indication of the selected handover trigger to the mobile terminal 300.

FIG. 5 shows an exemplary source base station 100 for executing the method 400 of FIG. 2. The source base station 100 comprises a KPI circuit 110, a trigger selection circuit 120, a transceiver 130, and a parameter circuit 140. KPI circuit 110 is configured to obtain the KPI(s) for each candidate trigger, while the parameter circuit 140 is configured to obtain at least one parameter associated with the mobile terminal 300 and/or the network 50, where the parameter indirectly or directly impacts handover performance. The KPI circuit 110 may obtain some or all of the KPI(s) from the mobile terminal 300 via transceiver 130, and/or the KPI circuit 110 may obtain some or all of the KPI(s) by directly determining the KPI(s). For example, the KPI circuit 110 may directly determine the number of ping-pong handovers for each of the candidate triggers from statistics stored in the network 50, or may measure the RSRP associated with each candidate trigger. The data used to determine the KPIs may be stored in the source base station 100, in the mobile terminal 300, or somewhere else in the network 50.

If the obtained parameter passes a corresponding performance test, a control message circuit 124 in the trigger selection circuit 120 is configured to generate a resource control message 600, which includes a first information element 610 comprising the obtained KPI(s). As noted above and shown in FIG. 4, the generated resource control message 600 may also include one or more additional IEs 620-640. The trigger selection circuit 120 then sends the generated resource control message to the mobile terminal 300 via transceiver 130 to facilitate a selection at the mobile terminal 300 of one of the candidate triggers based on a comparison between the KPIs performed by the mobile terminal 300. Otherwise, the trigger selection circuit 120 selects one of the candidate triggers as the handover trigger based on a comparison between the KPIs. As discussed further herein, the trigger selection circuit 120 may include a ranking circuit 122 that ranks KPIs based on a preferred emphasis. Other elements not explicitly shown in FIG. 5 may also be present in the source base station 100, e.g., a network interface, memory, signal processing circuitry, etc.

FIG. 6 shows an exemplary mobile terminal 300 for executing the method 500 of FIG. 3. Mobile terminal 300 comprises a transceiver 310, trigger selection circuit 320, and processor 330. The transceiver 310 receives a resource control message from the source base station 100 when a variable network parameter passes a corresponding performance test. The trigger selection circuit 320 is configured to compare KPIs, e.g., the received KPIs. Based on the results of the comparison(s), the trigger selection circuit 320 selects one of the candidate triggers. The processor 330 may also be configured to obtain KPI(s), e.g., by directly determining the KPI(s). For example, processor 330 may measure the RSRP, SNR, and/or SINR and associate the measured RSRP, SNR, SINR (or an average or filtered value of multiple measurements) with the current handover trigger being used by the mobile terminal 300. The mobile terminal 300 may store the determined KPI(s) for the current handover trigger so that the determined KPI(s) may be available to the mobile terminal 300 for comparison with another like KPI obtained at a later time.

Regardless of whether the source base station 100 or the mobile terminal 300 determines the handover trigger, each candidate trigger may be associated with more than one KPI, and multiple KPIs may be used to select the handover trigger. FIG. 7 shows an exemplary method 700 where N KPIs exist for each of two candidate triggers, e.g., $KPI_{nA}$ for a first candidate trigger and $KPI_{nB}$ for a second candidate trigger, where n=1, . . . , N. To determine the handover trigger, the trigger selection circuit 120, 320 performs one or more KPI comparisons, e.g., by determining a difference between two corresponding KPIs according to:

$$DIFF_n = |KPI_{nA} - KPI_{nB}|. \quad (1)$$

Equation (1) uses the absolute value to ensure that the difference has a positive value. The trigger selection circuit 120, 320 subsequently makes the selection based on the set of KPIs associated with the first difference to exceed a predetermined margin.

More particularly, the trigger selection circuit 120, 320 determines a first difference $DIFF_1$ between a first pair of KPIs ($KPI_{1A}$ and $KPI_{1B}$) according to Equation (1), where n=1 (block 710), and determines if $DIFF_1$ exceeds a predetermined margin $MARGIN_1$ (block 720). If $DIFF_1 > MARGIN_1$ (block 720), the trigger selection circuit 120, 320 selects the better performing candidate trigger, e.g., the candidate trigger associated with the better one of $KPI_{1A}$ and $KPI_{1B}$ (block 730). For example, if $KPI_{1A}$ and $KPI_{1B}$ represent a signal-to-noise ratio for the respective candidate triggers, the trigger selection circuit 120, 320 will select the candidate trigger associated with the largest signal-to-noise ratio as the handover trigger when $DIFF_1 > MARGIN_1$. If $DIFF_1 \leq MARGIN_1$ (block 720), however, the trigger selection circuit 120, 320 determines the difference $DIFF_2$ between the next pair of KPIs (block 740), and determines if $DIFF_2$ exceeds a second predetermined margin (block 750). If $DIFF_2 > MARGIN_2$ (block 650), the trigger selection circuit 120, 320 selects the better performing candidate trigger, e.g., the candidate trigger associated with the better one of $KPI_{2A}$ and $KPI_{2B}$ (block 730). For example, if $KPI_{2A}$ and $KPI_{2B}$ represent a number of handover failures or a handover failure rate for the respective candidate triggers, the trigger selection circuit 120, 320 will select the candidate trigger associated with the smallest number of handover failures or the smallest handover failure rate as the handover trigger when $DIFF_2 > MARGIN_2$. If $DIFF_2 \leq MARGIN_2$ (block 750), however, the trigger selection circuit 120, 320 moves on to the next pair of KPIs. This process continues for each pair of KPIs until the trigger selection circuit 120, 320 finds a pair of KPIs having a difference exceeding a predetermined margin, or until the trigger selection circuit 120, 320 determines the difference $DIFF_N$ for the last pair of KPIs (block 760) and determines that $DIFF_N \leq MARGIN_N$ (block 770). In that scenario, the trigger selection circuit 120, 320 may select a default trigger (block 780). For example, the default handover trigger may comprise a current handover trigger currently used by the mobile terminal 300.

In some embodiments, trigger selection circuit 120, 320 executes the KPI comparisons according to some random order. In other embodiments, the trigger selection circuit 120, 320 may rank the KPIs and sequentially execute the KPI comparisons in the order defined by the ranking. In this embodiment, the trigger selection circuit 120, 320 may comprise a ranking circuit 122, 322 configured to rank each pair of KPIs based on a preferred emphasis in descending order. For example, when the handover failure rate has been determined to be the most important parameter, followed by the signal-to-noise ratio (SNR), and then the reference signal received power (RSRP), the ranking circuit 122, 322 may rank the pair of handover failure rate KPIs higher than the pair of SNR KPIs, which are ranked higher than the pair of RSRP KPIs. The trigger selection circuit 120, 320 then executes the process of FIG. 7 according to this ranking, e.g., such that blocks 710 and 720 deal with the handover failure rate KPIs, blocks 740 and 750 deal with the SNR KPIs, and blocks 760 and 770 deal with the RSRP KPIs.

While the embodiments and examples disclosed herein present the solution in terms of two candidate triggers, any number of candidate triggers may be used. For example, one or more KPIs may be obtained for each of two or more candidate triggers, where each set of KPIs comprises a KPI corresponding to the same parameter for a different candidate trigger. The trigger selection circuit 120, 320 selects the handover trigger based on a comparison between the KPIs in a set of KPIs. In one embodiment, the comparisons may comprise simultaneous comparisons of all of the KPIs in a set of KPIs, e.g., all of the SNR KPIs. Alternatively, the comparison may comprise multiple evaluations/comparisons of subsets of the set of KPIs, e.g., subsets of the SNR KPIs.

In some embodiments, the source base station 100 may store the KPIs and the corresponding candidate triggers so as to create a database of information regarding the handover performance associated with different triggers. While the information in such a database may vary from base station to base station, some or all of the database information may be exchanged and/or shared among base stations, e.g., using an X2 or S1 interface. Such an exchange of information may be used to assist with initial handover settings and/or for future handover trigger selection.

The solution disclosed herein enables handover performance to be evaluated from a comprehensive viewpoint. The performance can be evaluated automatically, both at the mobile terminal and at the network, such that the handover trigger(s) may be dynamically adapted and adjusted to get a good handover performance. Thus, the solution disclosed herein reduces the handover failure rate as well as improves system and service performance.

The mobile terminal 300 (or another suitable component of wireless network 50) may initiate handover of a communication session associated with the mobile terminal 300 between a source base station 100 and target base station 200, based on the selected handover trigger. For example, as explained above, the selected handover trigger may represent or include a hysteresis value and a TTT value in particular embodiments. In such embodiments, mobile terminal 300 may detect that a signal strength measurement for target base station 200 exceeds a signal strength measurement for source base station 100 by more than an amount indicated by the hysteresis value of the selected handover trigger for longer than a period of time indicated by the TTT value of the selected handover trigger. In response to detecting this, mobile terminal 300 may notify the source base station 100 via a measurement report and start performing the handover to the target base station 200.

The mobile terminal 300 may send a measurement report, e.g., including measured signal strengths associated with neighbor base stations, to the source base station 100 to enable the source base station 100 to make the handover decision. In this case, the handover performance may further be improved by reducing the size of the measurement report sent by the mobile terminal 300, depending on one or more variable network parameters, e.g., mobile terminal speed. In this embodiment, the processor 330 in the mobile terminal 300 may measure the strength of a signal received from each of a plurality of neighbor base stations. The processor 330 may further obtain a parameter that indirectly or directly impacts the handover performance. For example, the processor 330 may receive information from the source base station 100 indicating the speed of the mobile terminal 300. The processor 330 then determines which and/or how many of the measured signal strengths should be included in a measurement report to be sent to the source base station 100 based on whether the obtained parameter passes a corresponding performance test. For example, if the speed of the mobile terminal 300 exceeds a speed threshold, the processor may include only a subset of the signal strength measurements. The subset may include as few as one signal strength measurement or as many as one less than the total available signal strength measurements. The processor 330 may e.g., opt to include the n strongest signal strength measurements, where n represents the size of the subset, when the speed exceeds a threshold. Subsequently, the transceiver 310 transmits the measurement report to the source base station 100. By reducing the size of the measurement report, e.g., when the mobile terminal 300 is moving at a high rate of speed, the mobile terminal 300 increases the robustness of the handover measurement reporting, which in turn reduces the possibility of handover failures. In this embodiment, the source base station 100 may be configured to blindly decode the received measurement report by assuming both a default size (including all of the signal strength measurements) and a reduced size of the measurement report.

The KPI circuit 110, trigger selection circuit 120, 320, performance parameter circuit 140, processor 330, and/or ranking circuit 122, 322 may be implemented in hardware and/or software. In all embodiments, the functionality provided by the described "circuits" or "processors" in the drawing figures, e.g., the KPI circuit 110, trigger selection circuit 120, 320, performance parameter circuit 140, processor 330, and/or ranking circuit 122, 322, etc., may more generally be implemented as dedicated hardware circuits (either analog or digital) as in the example of FIGS. 4 and 5; as programmable logic together with appropriate firmware; as software modules executed on one or more stored-program processors or digital signal processors (DSP); or in any combination thereof. Additionally, each of the described circuits may represent, in part or in whole, the same physical components as one or more of the other circuits. Thus, for example, KPI circuit 110, trigger selection circuit 120, performance parameter circuit 140, and/or ranking circuit 122 may, in some embodiments, all represent a single circuit or a common set of circuits while, in other embodiments, they may each represent separate independent circuits. Similarly, trigger selection circuit 320, processor 330, and/or ranking circuit 322 may, in some embodiments, all represent a single circuit or a common set of circuits while, in other embodiments, they may each represent separate independent circuits.

In all embodiments, the transceiver 130, 330 may comprise a receiver and transmitter interface used to communicate with one or more other transceivers via a Radio Access Network according to one or more communication protocols known in the art or that may be developed, e.g., IEEE 802.xx, CDMA, WCDMA, GSM, LTE, UTRAN, WiMax, or the like. The transceiver 530 implements transmitter and receiver functionality appropriate to the Radio Access Network links (e.g., frequency allocations and the like). The transmitter and receiver functions may share circuit components and/or software, or alternatively may be implemented separately.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a handover trigger at a mobile terminal for triggering a handover of the mobile terminal in a wireless network from a source base station to a target base station, the method comprising:
   receiving a resource control message from the source base station, the resource control message including a first information element comprising:
   a first Key Performance Indicator (KPI) of the wireless network for each of a first candidate trigger and a second candidate trigger;
   a second KPI for each of the first and second candidate triggers;
   wherein each first and second KPI indicates, for the corresponding candidate trigger, a quality of wireless services provided by the wireless network to the mobile terminal; and
   selecting one of the first and second candidate triggers as the handover trigger based on at least one of a first comparison between the first KPIs for the first and second candidate triggers and a second comparison between the second KPIs for the first and second candidate triggers by:
   selecting, as the handover trigger, the candidate trigger associated with a better one of the first KPIs if a first difference between the first KPIs exceeds a first predetermined margin; and
   if the first difference does not exceed the first predetermined margin, selecting, as the handover trigger, the candidate trigger associated with a better one of the second KIPs if a second difference between the second KPIs exceeds a second predetermined margin.

2. The method of claim 1 wherein selecting one of the first and second candidate triggers comprises selecting, as the handover trigger, the candidate trigger associated with a better one of the first KPIs when a difference between the first KPIs exceeds a predetermined margin.

3. The method of claim 1 wherein the resource control message further includes a second information element comprising an explicit instruction directing the mobile terminal to select one of the first and second candidate triggers as the handover trigger based on the first KPIs in the first information element.

4. The method of claim 1 wherein the resource control message further includes one or more additional information elements each comprising one of a mapping table and a handover trigger algorithm, wherein the mapping table maps different scenarios of one or more parameters to different handover triggers, and wherein the handover trigger algorithm comprises a sequence of steps to be executed by the mobile terminal to determine the handover trigger based on the first KPIs in the first information element.

5. The method of claim 1 further comprising, if neither the first difference nor the second difference exceed the respective first and second predetermined margins, selecting a default trigger as the handover trigger.

6. The method of claim 1:
   further comprising ranking the first and second KPIs based on a preferred emphasis on one of the first and second KPIs;
   wherein selecting one of the first and second candidate triggers comprises:
   sequentially executing at least one of the first and second comparisons according to the ranking; and
   selecting, as the handover trigger, one of the first and second candidate triggers based on one or more of the sequentially executed first and second comparisons.

7. The method of claim 1 further comprising:
   measuring a strength of a signal received from each of a plurality of neighbor base stations;
   obtaining a parameter that indirectly or directly impacts handover performance;
   determining which of the measured signal strengths should be included in a measurement report to be sent to the source base station based on whether the obtained parameter passes a corresponding performance test; and
   sending the measurement report to the source base station.

8. A mobile terminal configured to determine a handover trigger for triggering a handover of the mobile terminal in a wireless network from a source base station to a target base station, the mobile terminal comprising:
   a receiver configured to receive, from the source base station, a resource control message including a first information element comprising:
   a first Key Performance Indicator (KPI) of the wireless network for each of a first candidate trigger and a second candidate trigger
   a second KPI for each of the first and second candidate triggers;
   wherein each first and second KPI indicates, for the corresponding candidate trigger, a quality of wireless services provided by the wireless network to the mobile terminal; and
   a trigger selection circuit configured to select one of the first and second candidate triggers as the handover trigger based on at least one of a first comparison between the first KPIs for the first and second candidate triggers and a second comparison between the second KPIs for the first and second candidate triggers by:
   selecting, as the handover trigger, the candidate trigger associated with a better one of the first KPIs if a first difference between the first KPIs exceeds a first predetermined margin; and
   if the first difference does not exceed the first predetermined margin, selecting, as the handover trigger, the candidate trigger associated with a better one of the second KIPs if a second difference between the second KPIs exceeds a second predetermined margin.

9. The mobile terminal of claim 8 wherein the trigger selection circuit is configured to select one of the first and second candidates by selecting, as the handover trigger, the candidate trigger associated with a better one of the first KPIs when a difference between the first KPIs exceeds a predetermined margin.

10. The mobile terminal of claim 8 wherein the resource control message further includes a second information element comprising an explicit instruction directing the mobile terminal to select one of the first and second candidate triggers as the handover trigger based on the first KPIs in the first information element.

11. The mobile terminal of claim 8 wherein the resource control message further includes one or more additional information elements each comprising one of a mapping table and a handover trigger algorithm, wherein the mapping table maps different scenarios of one or more parameters to different handover triggers, and wherein the handover trigger algorithm comprises a sequence of steps to be executed by the mobile terminal to determine the handover trigger based on the first KPIs in the first information element.

12. The mobile terminal of claim 8 wherein the trigger selection circuit is further configured to, if neither the first difference nor the second difference exceed the respective first and second predetermined margins, select a default trigger as the handover trigger.

13. The mobile terminal of claim 8:
the trigger selection circuit comprises a ranking circuit configured to rank the first and second KPIs based on a preferred emphasis on one of the first and second KPIs; and
wherein the trigger selection circuit is configured to select one of the first and second candidate triggers by:
sequentially executing at least one of the first and second comparisons according to the ranking; and
selecting, as the handover trigger, one of the first and second candidate triggers based on one or more of the sequentially executed first and second comparisons.

14. The mobile terminal of claim 8 further comprising:
a processor configured to:
measure a strength of a signal received from each of a plurality of neighbor base stations;
obtain a parameter that indirectly or directly impacts handover performance; and
determine which of the measured signal strengths should be included in a measurement report to be sent to the source base station based on whether the obtained parameter passes a corresponding performance test; and
a transmitter configured to send the measurement report to the source base station.

15. The method of claim 1, wherein each candidate trigger includes a hysteresis value.

16. The method of claim 1, wherein the selected handover trigger is used to initiate the handover of the mobile terminal from the source base station to the target base station.

17. The mobile terminal of claim 8, wherein each candidate trigger includes a hysteresis value.

18. The mobile terminal of claim 8, wherein the selected handover trigger is used to initiate the handover of the mobile terminal from the source base station to the target base station.

* * * * *